United States Patent
Park et al.

(10) Patent No.: US 10,451,153 B2
(45) Date of Patent: Oct. 22, 2019

(54) CHAIN TENSIONER

(71) Applicant: YUSHIN PRECISION INDUSTRIAL CO., LTD., Incheon (KR)

(72) Inventors: Youngkyun Park, Seongnam-si (KR); Jungjin Lee, Incheon (KR)

(73) Assignee: Yushin Precision Industrial Co., Ltd., Incheon (KR)

( * ) Notice: Subject to any disclaimer, the term of this patent is extended or adjusted under 35 U.S.C. 154(b) by 149 days.

(21) Appl. No.: 15/453,155

(22) Filed: Mar. 8, 2017

(65) Prior Publication Data
US 2018/0195584 A1    Jul. 12, 2018

(30) Foreign Application Priority Data
Jan. 12, 2017 (KR) .................. 10-2017-0005508

(51) Int. Cl.
*F16H 7/08* (2006.01)

(52) U.S. Cl.
CPC ....... *F16H 7/08* (2013.01); *F16H 2007/0806* (2013.01); *F16H 2007/0872* (2013.01); *F16H 2007/0891* (2013.01)

(58) Field of Classification Search
CPC ............... F16H 2007/0806; F16H 7/08; F16H 2007/0891; F16H 7/0848; F16H 2007/0859
USPC .................................................. 474/110, 111
See application file for complete search history.

(56) References Cited

U.S. PATENT DOCUMENTS

| | | | | |
|---|---|---|---|---|
| 2,375,050 A * | 5/1945 | Tauscher | ........... | B64C 13/30 188/317 |
| 3,252,347 A * | 5/1966 | Seaman | ........... | F02B 67/06 474/111 |
| 3,276,282 A * | 10/1966 | Duncan | ........... | F16H 7/08 474/111 |
| 3,370,476 A * | 2/1968 | Hill | ........... | F16H 7/08 474/111 |
| 3,463,025 A * | 8/1969 | Poyser | ........... | F16H 7/08 474/111 |
| 3,574,418 A * | 4/1971 | Okabe | ........... | B62D 55/30 267/34 |
| 4,312,267 A * | 1/1982 | Shenberger | ........... | F16H 7/1281 100/179 |
| 4,539,001 A * | 9/1985 | Okabe | ........... | F16H 7/0836 474/110 |
| 4,790,796 A * | 12/1988 | Okabe | ........... | F16H 7/08 474/110 |
| 4,889,087 A * | 12/1989 | Bergsten | ........... | F16H 7/0848 123/90.31 |
| 4,940,447 A * | 7/1990 | Kawashima | ........... | F16F 13/00 474/110 |

(Continued)

FOREIGN PATENT DOCUMENTS

JP    3162645 B2    5/2001
JP    5820938 B1    11/2015
(Continued)

*Primary Examiner* — Henry Y Liu
(74) *Attorney, Agent, or Firm* — Harness, Dickey & Pierce, P.L.C.

(57) ABSTRACT

Provided is a chain tensioner. The chain tensioner includes a guide member, a support member spaced apart from the guide member, and at least one first coil spring disposed between the guide member and the support member to elastically support the guide member.

10 Claims, 12 Drawing Sheets

(56) References Cited

U.S. PATENT DOCUMENTS

| | | | | |
|---|---|---|---|---|
| 4,952,198 A * | 8/1990 | Cartaud | F16H 7/1236 | 474/110 |
| 5,021,032 A * | 6/1991 | Macchiarulo | F16H 7/08 | 474/117 |
| 5,180,340 A * | 1/1993 | Vahabzadeh | F16G 13/04 | 474/111 |
| 5,700,216 A * | 12/1997 | Simpson | F16H 7/08 | 474/110 |
| 5,720,683 A * | 2/1998 | Patton | F16H 7/08 | 474/109 |
| 5,776,024 A * | 7/1998 | White | F16H 7/08 | 474/101 |
| 5,989,138 A * | 11/1999 | Capucci | F16H 7/08 | 474/109 |
| 5,993,342 A * | 11/1999 | Wigsten | F16H 7/08 | 474/110 |
| 6,093,123 A * | 7/2000 | Baddaria | F01L 1/02 | 474/110 |
| 6,117,033 A * | 9/2000 | Simpson | F16H 7/0829 | 474/110 |
| 6,599,209 B1 * | 7/2003 | Ullein | F16H 7/08 | 474/111 |
| 6,634,973 B1 * | 10/2003 | Simpson | F16H 7/0848 | 474/109 |
| 6,641,496 B2 | 11/2003 | Tada | | |
| 6,699,148 B1 * | 3/2004 | Taylor | B65G 19/02 | 474/109 |
| 6,716,124 B2 * | 4/2004 | Markley | F16H 7/0848 | 474/109 |
| 7,174,799 B2 * | 2/2007 | Yoshida | F16H 7/0836 | 474/101 |
| 7,479,077 B2 * | 1/2009 | Markley | F16H 7/08 | 474/101 |
| 7,641,577 B2 * | 1/2010 | Markley | F16H 7/08 | 474/109 |
| 7,850,559 B2 * | 12/2010 | Botez | F16H 7/0848 | 474/101 |
| 7,955,206 B2 * | 6/2011 | Smart | F16H 7/0831 | 474/109 |
| 8,535,187 B2 * | 9/2013 | Herbert | F01L 1/022 | 474/110 |
| 9,605,732 B2 * | 3/2017 | Smith | F16H 7/0848 | |
| 9,874,267 B2 * | 1/2018 | Wigsten | F16H 7/0836 | |
| 9,879,764 B2 * | 1/2018 | Todd | F16H 7/08 | |
| 10,077,825 B2 * | 9/2018 | Todd | F16H 7/0836 | |
| 10,094,449 B2 * | 10/2018 | Takagi | F16H 7/08 | |
| 2002/0006841 A1 * | 1/2002 | Simpson | F16H 7/0848 | 474/110 |
| 2003/0051956 A1 * | 3/2003 | Serkh | F16F 7/08 | 188/322.14 |
| 2006/0089220 A1 * | 4/2006 | Haesloop | F16H 7/0836 | 474/109 |
| 2006/0094549 A1 * | 5/2006 | Yoshida | F16H 7/0836 | 474/110 |
| 2007/0032322 A1 * | 2/2007 | Beardmore | F16H 7/0848 | 474/110 |
| 2007/0066427 A1 * | 3/2007 | Simpson | F16H 7/08 | 474/111 |
| 2008/0214341 A1 * | 9/2008 | Schuseil | F16H 7/08 | 474/111 |
| 2008/0280712 A1 * | 11/2008 | Ryouno | F16H 7/0836 | 474/110 |
| 2010/0050969 A1 * | 3/2010 | Kameda | F01L 1/02 | 123/90.45 |
| 2012/0192821 A1 * | 8/2012 | Herbert | F01L 1/022 | 123/90.31 |
| 2015/0031485 A1 * | 1/2015 | Lindstrom | F16H 7/1218 | 474/135 |
| 2016/0033016 A1 * | 2/2016 | Todd | F16H 7/0836 | 474/111 |
| 2016/0084359 A1 * | 3/2016 | Wigsten | F16H 7/0836 | 474/110 |
| 2016/0305512 A1 * | 10/2016 | Takagi | F16H 7/08 | |

FOREIGN PATENT DOCUMENTS

| | | |
|---|---|---|
| JP | 2016-148395 A | 8/2016 |
| WO | WO-2016/028730 A1 | 2/2016 |

* cited by examiner

CHAIN TENSIONER

CROSS-REFERENCE TO RELATED APPLICATIONS

This U.S. non-provisional patent application claims priority under 35 U.S.C. § 119 of Korean Patent Application No. 10-2017-0005508, filed on Jan. 12, 2017, the entire contents of which are hereby incorporated by reference.

BACKGROUND

The present disclosure herein relates to a chain tensioner, and more particularly, to a chain tensioner that adjusts tensile force of a chain by using coil springs.

A timing drive system of a vehicle includes a belt drive system and a chain drive system. Since the chain system has durability greater than that of the belt system, the chain drive system is mainly used for the timing drive system of the vehicle.

The timing chain of the chain drive system may connect a crank sprocket connected to a crank shaft and cam sprockets, which are respectively connected to cam shafts, to each other. Thus, the timing chain may transmit driving force of the crank shaft to the cam shafts. However, a predetermined portion of the timing chain may be released when the timing chain is driven by the driving force of the crank shaft. Thus, the chain drive system may include a chain tensioner that adjusts tensile force of the timing chain. In general, a hydraulic tensioner that receives an oil pressure to adjust the tensile force of the timing chain by using pushing force of a piston. However, studies on a chain tensioner that adjusts the tensile force of the timing chain by using other force, but not the oil pressure are ongoing.

SUMMARY

The present disclosure provides a chain tensioner that has a simple structure and is capable of supporting a large load.

The present disclosure also provides a chain tensioner that is reduced in weight and/or manufacturing cost.

The objects of the present invention are not limited to the aforementioned object, but other objects not described herein will be clearly understood by those skilled in the art from descriptions below.

An embodiment of the inventive concept provides a chain tensioner includes: a guide member; a support member spaced apart from the guide member; and at least one first coil spring disposed between the guide member and the support member to elastically support the guide member.

Particularities of other embodiments are included in the detailed description and drawings.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, ideas and embodiments of the inventive concept will be described in detail with reference to the accompanying drawings.

Figure 1:
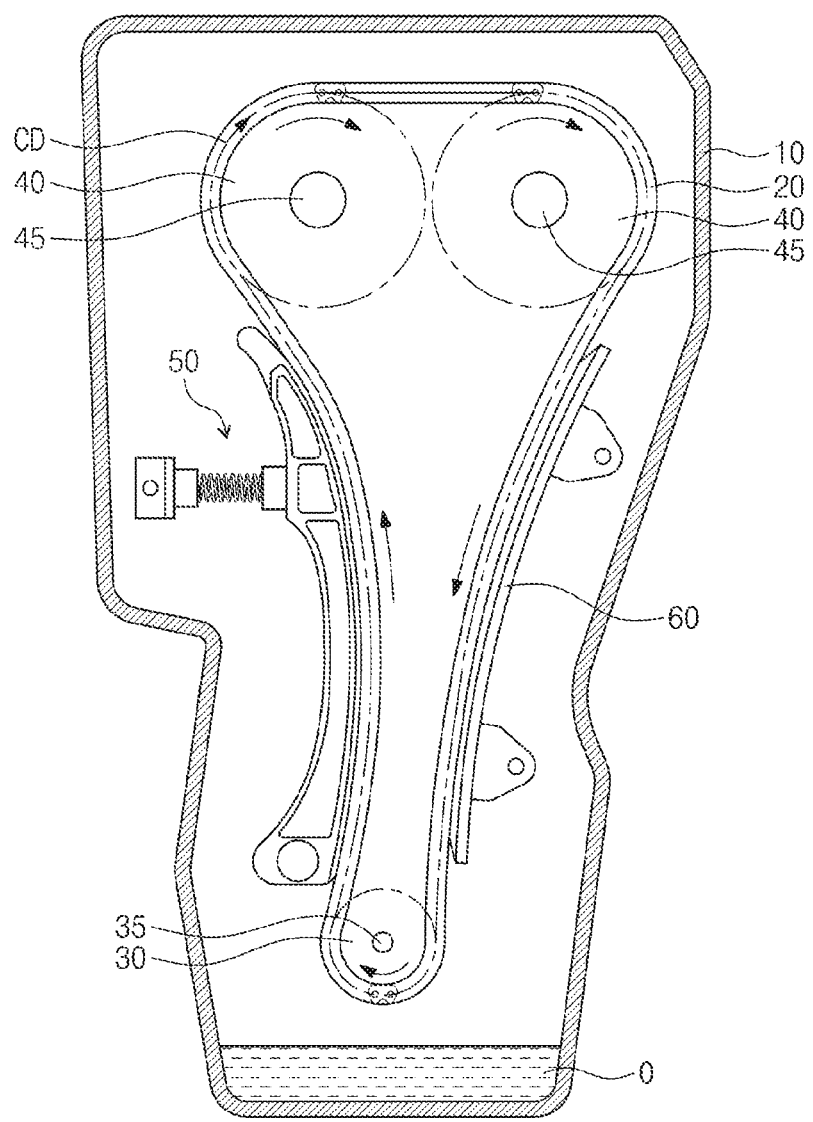
FIG. 1 is a schematic view of a timing chain system according to embodiments of the inventive concept.

FIG. 1 is a schematic view of a timing chain system according to embodiments of the inventive concept.

Referring to FIG. 1, a timing chain system 1 according to an embodiment of the inventive concept may be used for an engine of a vehicle. The timing chain system 1 may represent a system that connects a driving sprocket 30 connected to a crank shaft 35 to driven sprockets 40 connected to cam shafts 45 through a chain 20 to rotate the cam shafts 45.

The timing chain system 1 may include a housing 10, a chain 20, a chain tensioner 50, a chain guide 60, the driving sprocket 30, and the driven sprockets 40.

The housing 10 may have a space therein. The chain 20, the chain tensioner 50, the chain guide 60, the driving sprocket 30, and the driven sprockets 40 may be disposed in the inner space of the housing 10. Oil 0 may be accommodated in the housing 10. The oil 0 may be supplied to the chain 20 and the chain guide 60 through an oil pump (not shown).

The chain 20 may connect the driving sprocket 30 to the driven sprockets 40. For example, the chain 20 may connect the driving sprocket 30 to a portion of a circumference of each of the driven sprockets 40. The chain 20 may be provided as a close loop. The chain 20 may have a traveling direction CD that is equal to a rotation direction of the driving sprocket 30. In an embodiment, the chain 20 may be a silent chain, but the embodiment of the inventive concept is not limited thereto. For example, the chain 20 may be a roller chain or a bush chain.

The driving sprocket 30 may be connected to the crank shaft 35. The driving sprocket 30 may receive driving force from the crank shaft 35 to rotate. The driving sprocket 30 may be disposed below the driven sprockets 40. The driving sprocket 30 may have a plurality of sawteeth (not shown) along a circumference thereof. The plurality of sawteeth may be engaged with the chain 20.

The driven sprockets 40 may be connected to the driving sprocket 30 through the chain 20. Thus, the driven sprockets 40 may receive rotation force of the driving sprocket 30 through the chain 20. That is, when the driving sprocket 30 rotates, the driven sprockets 40 may rotate through the chain 20. Each of the driven sprockets 40 may have a plurality of sawteeth (not shown) along a circumference thereof. The plurality of sawteeth may be engaged with the chain 20. Each of the driven sprockets 40 may be connected to each of the cam shafts 45 to rotate the cam shafts 45. Each of the driven sprockets 40 may rotate in the same direction as the rotation direction of the driving sprocket 30.

The chain guide 60 may guide the traveling direction CD of the chain 20. The chain guide 60 may come into slide-contact with the chain 20. The chain guide 60 may be fixed within the housing 10. The chain guide 60 may be disposed between the driving sprocket 30 and the driven sprockets 40.

The chain tensioner 50 may come into contact with the chain 20 to adjust tensile force of the chain 20. The chain tensioner 50 may press the chain 20 to support a load of the chain 20. The chain tensioner 50 may be disposed to face the chain guide 60. The chain tensioner 50 will be described in detail with reference to FIGS. 2 to 9.

Figure 2:
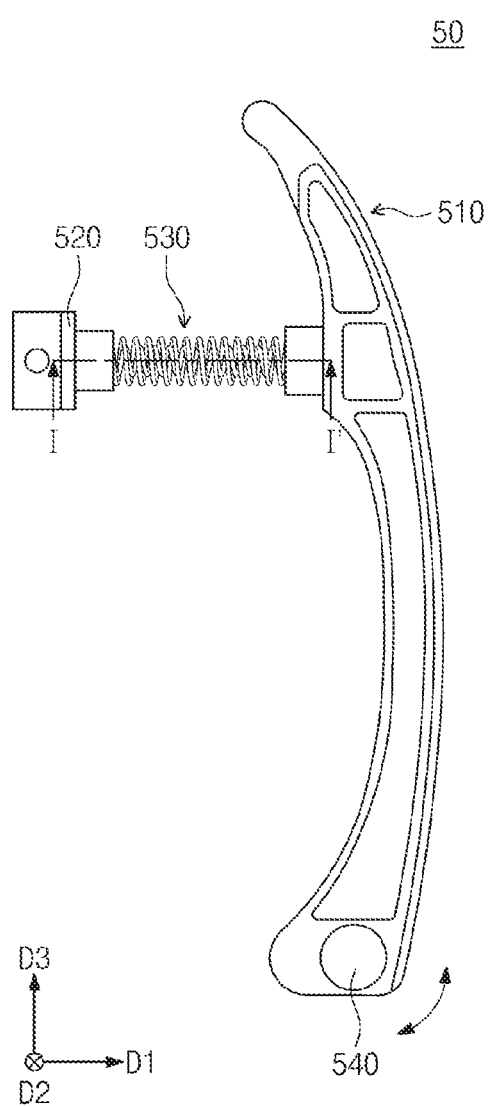
FIG. 2 is a schematic view of the chain tensioner of FIG. 1.

FIG. 2 is a schematic view of the chain tensioner of FIG. 1.

Referring to FIG. 2, the chain tensioner 50 may include a support member 520, a guide member 510, an elastic member 530, and a hinge shaft 540.

The guide member 510 may come into slide-contact with the chain 20. The guide member 510 may be connected to the elastic member 530 and the hinge shaft 540. The guide member 510 may receive elastic force of the elastic member 530. The guide member 510 may rotate with respect to the hinge shaft 540. The guide member 510 will be described later in detail with reference to FIGS. 3 to 5.

The support member 520 may be disposed to be spaced apart from the guide member 510. For example, the support member 520 may be spaced apart from the guide member 510 in a direction opposite to the first direction D1. In other word, the guide member 510 may be disposed between the chain 20 and the support member 520. The support member 520 may support the elastic member 530. The support member 520 will be described later in detail with reference to FIGS. 6 and 7.

The elastic member 530 may be disposed between the support member 520 and the guide member 510. The elastic member 530 may elastically support an area of one end of the guide member 510. The elastic member 530 may have one end coming into contact with the support member 520 and the other end coming into contact with the guide member 510. The support member 520 may be coupled to the housing 10.

The hinge shaft 540 may be connected to an area of the other end of the guide member 510. For example, the hinge shaft 540 may pass through the area of the other end of the guide member 510. Thus, the elastic member 530 may be spaced apart from the hinge shaft 540 in a third direction D3 perpendicular to the first direction D1. Here, the third direction D3 may be parallel to a longitudinal direction of the guide member 510. Also, a second direction D2 perpendicular to the first and third directions D1 and D3 may be parallel to a width direction of the guide member 510. The hinge shaft 540 may be coupled to the housing 10.

Figure 3:
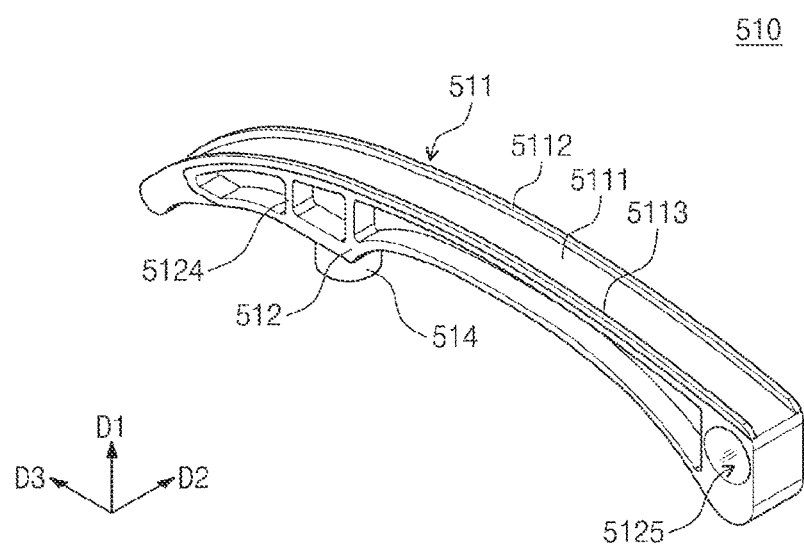
FIG. 3 is a perspective view of a guide member of FIG. 2.
Figure 4:
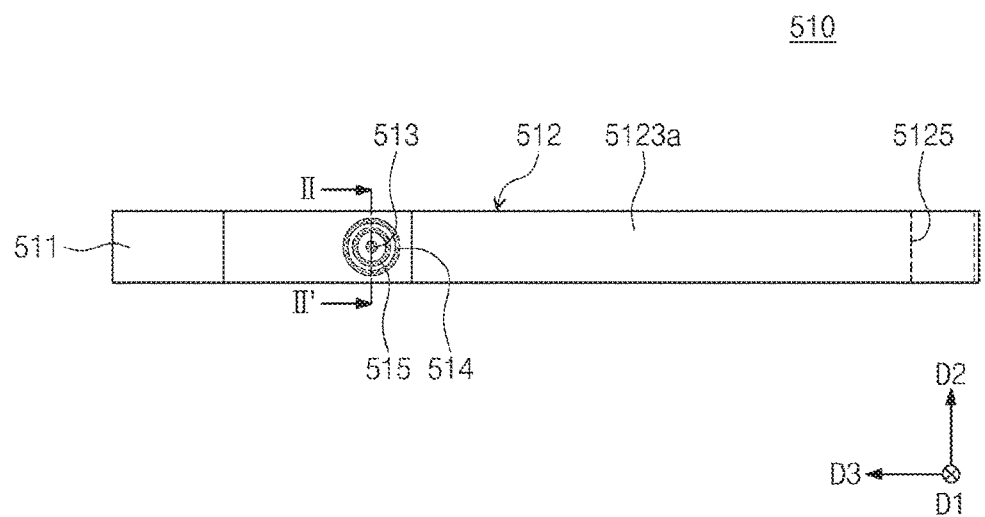
FIG. 4 is a rear view of the guide member of FIG. 2.
Figure 5:
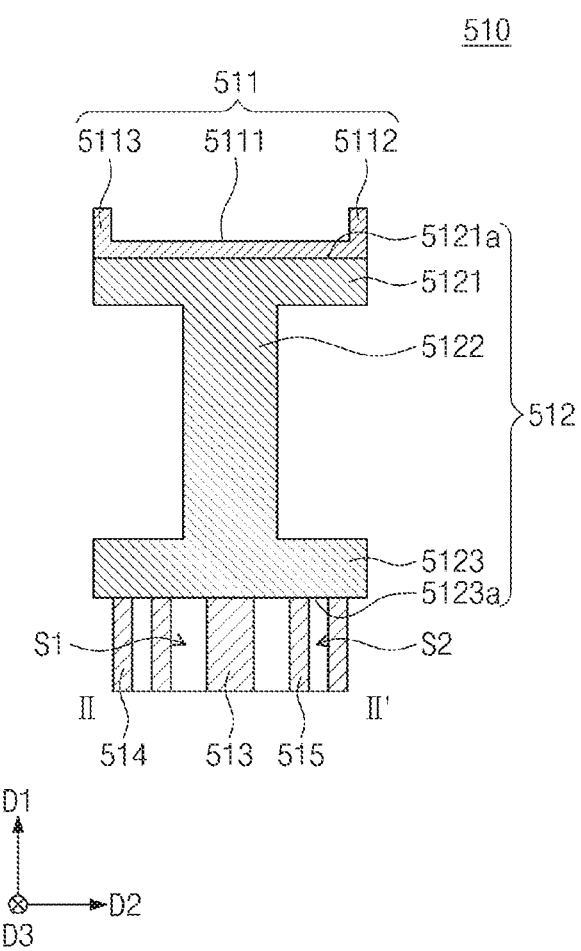
FIG. 5 is a cross-sectional view taken along line II-II' of FIG. 4.

FIG. 3 is a perspective view of the guide member of FIG. 2. FIG. 4 is a rear view of the guide member of FIG. 2. FIG. 5 is a cross-sectional view taken along line II-II' of FIG. 4.

Referring to FIGS. 2 to 5, the guide member 510 may include a guide shoe 511, a main body 512, a first protrusion 513, a first inner sidewall 515, and a first outer sidewall 514.

The guide shoe 511 may come into slide-contact with the traveling chain (see reference numeral 20 of FIG. 1). The guide shoe 511 may be made of a material having superior wear resistance. For example, the guide shoe 511 may be made of a synthetic resin material. The guide shoe 511 may have a guide surface 5111 coming into contact with the chain 20. The guide surface 5111 may be smooth. The guide surface 5111 may have a width corresponding to that of the chain 20. In this specification, the width direction may represent the second direction D2. The guide surface 5111 may have a shape of which an intermediate area protrudes to the chain (see reference numeral 20 of FIG. 1). That is, the guide surface 5111 may have a predetermined curvature.

The guide shoe 511 may include first and second protrusion hooks 5112 and 5113 protruding from the guide surface 5111. The first and second protrusion hooks 5112 and 5113 may be extended along the longitudinal direction D3 of the guide member 510 (hereinafter, referred to as the third direction) and/or in the traveling direction (see reference symbol CD of FIG. 1) of the chain 20. Here, the longitudinal direction D3 of the guide member 510 may be perpendicular to the second direction D2. The first and second protrusion hooks 5112 and 5113 may be disposed to face each other. For example, the first protrusion hook 5112 may be spaced apart from the second protrusion hook 5113 in the second direction D2. The first and second protrusion hooks 5112 and 5113 may prevent the chain 20 from being separated from the guide surface 5111.

The main body 512 may support the guide shoe 511. The main body 512 may be disposed between the elastic member 530 and the guide shoe 511. The main body 512 may have a first surface 5121a supporting the guide shoe 511 and a second surface 5123a facing the first surface 5121a. For example, the first surface 5121a may be spaced apart from the second surface 5123a in the first direction D1. The second surface 5123a may come into contact with the elastic member 530. This will be described later in detail with reference to FIGS. 9 and 10.

The main body 512 may be made of a synthetic resin material different from that of the guide shoe 511. The main body 512 may have an insertion hole 5125 into which the above-described hinge shaft 540 is inserted. The insertion hole 5125 may pass through the main body 512. The insertion hole 5125 may be defined adjacent to an end of the main body 512. The main body 512 may include a first support part 5121, a connection part 5122, a second support part 5123, and a rib part 5124.

The first support part 5121 may support the guide shoe 511. The first support part 5121 may have the first surface 5121a. The first and second support parts 5121 and 5123 may be spaced apart from each other. The second support part 5123 may have the second surface 5123a. The connection part 5122 may be disposed between the first and second support parts 5121 and 5123. The connection part 5122 may connect the first and second support parts 5121 and 5123 to each other. The connection part 5122 may have a width less than that of each of the first and second support parts 5121 and 5123. Thus, the main body 512 may have a longitudinal cross-section having an approximate "I" shape.

The rib part 5124 may be disposed on the connection part 5122 to connect the first and second support parts 5121 and 5123 to each other. Thus, the rib part 5124 may reinforce durability of the connection part 5122 against an external force.

The first protrusion 513, the first outer sidewall 514, and the first inner sidewall 515 may protrude from the second surface 5123a in a direction opposite to the first direction D1. For example, the first protrusion 513, the first outer sidewall 514, and the first inner sidewall 515 may protrude from the second surface 5123a to the support member 520 and/or the elastic member 530. At least two of the first protrusion 513, the first outer sidewall 514, or the first inner sidewalls 515 may have heights different from each other. For example, the first protrusion 513 and the first inner sidewalls 515 may have heights higher than that of the first outer sidewall 514, Here, the height may represent a distance that is spaced apart from the second surface 5123a in the opposite direction of the first direction D1.

The first protrusion 513 may have a pillar shape, but is not limited thereto. The first inner sidewall 515 may have a cylindrical shape, but is not limited thereto. The first inner sidewall 515 may be spaced apart from the first protrusion 513. The first inner sidewall 515 may surround a circumference of the first protrusion 513. The first inner sidewall 515 may have an inner diameter greater than a width of the first protrusion 513. Thus, a first space S1 may be defined between the first inner sidewall 515 and the first protrusion 513.

The first outer sidewall 514 may be spaced apart from the first inner sidewall 515. The first outer sidewall 514 may surround a circumference of the first inner sidewall 515. The first outer sidewall 514 may have an inner diameter greater than an outer diameter of the first inner sidewall 515. Thus, a second space S2 may be defined between the first outer sidewall 514 and the first inner sidewall 515. The first inner sidewall 515 may be disposed between the first outer sidewall 514 and the first protrusion 513.

In FIG. 4, unlike other components displayed as plain patterns, the respective components are displayed as predetermined dotted patterns to see the configuration in which the first protrusion 513, the first inner sidewall 515, and the first outer sidewall 514 are spaced apart from each other.

Figure 6:
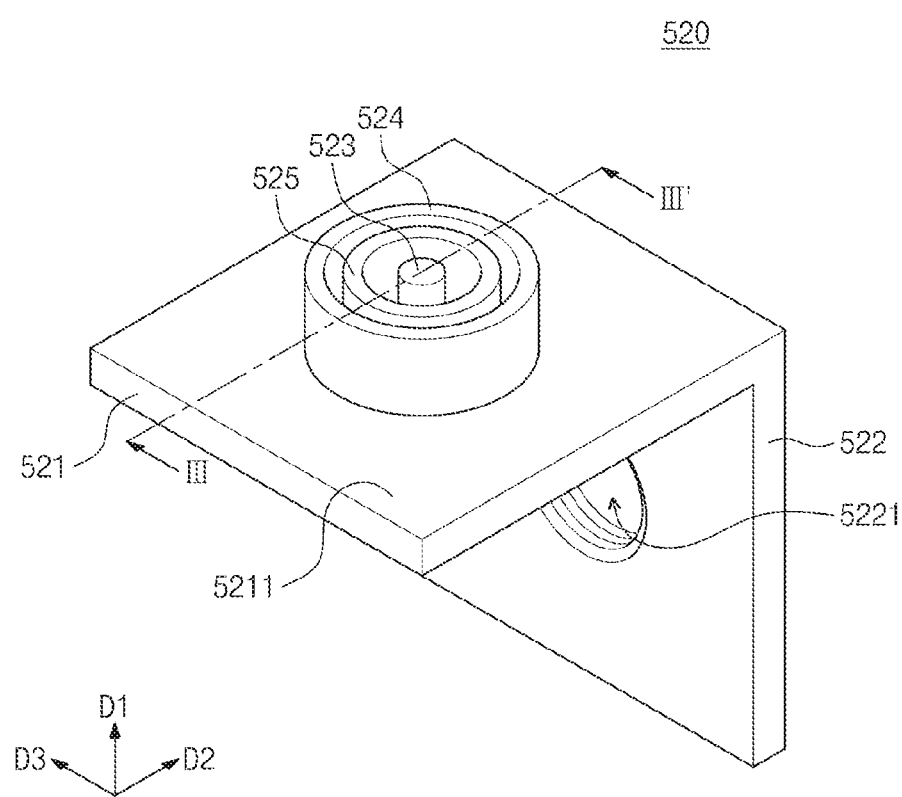
FIG. 6 is a perspective view of a support member of FIG. 2.
Figure 7:
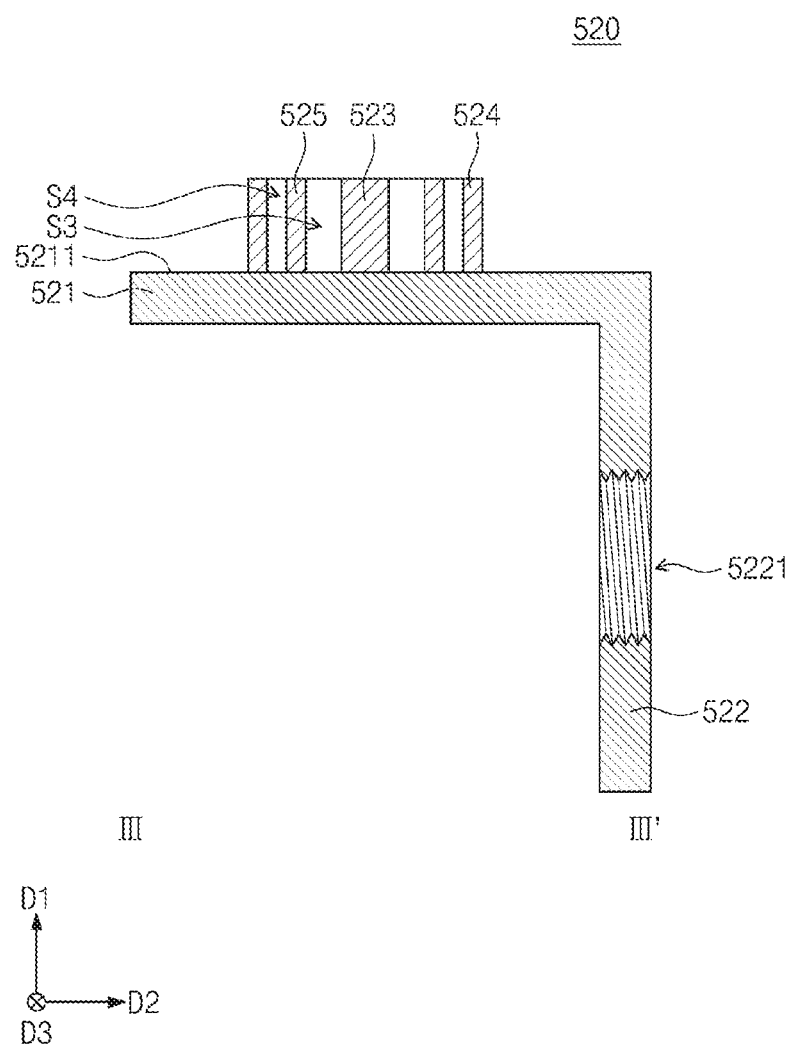
FIG. 7 is a cross-sectional view taken along line III-III' of FIG. 6.

FIG. 6 is a perspective view of the support member of FIG. 2. FIG. 7 is a cross-sectional view taken along line III-III' of FIG. 6.

Referring to FIGS. 2, 6, and 7, the support member 520 may include a support plate 521, a coupling plate 522, a second protrusion 523, a second outer sidewall 524, and a second inner sidewall 525.

The support plate 521 may support the elastic member 530. The support plate 521 may have a support surface 5211. The support surface 5211 may come into contact with an end of each of first and second coil springs (see reference numeral 531 and 532 of FIG. 9) that will be described later. That is, the support surface 5211 may support the first and second coil springs 531 and 532 that will be described later. The support surface 5211 may be a flat surface, but is not limited thereto.

The second protrusion 523, the second outer sidewall 524, and the second inner sidewall 525 may protrude from the support surface 5211 of the support plate 521 in the first direction D1. For example, the second protrusion 523, the second outer sidewall 524, and the second inner sidewall 525 may protrude from the support surface 5211 of the support plate 521 to the guide member 510 and/or the elastic member 530. At least two of the second protrusion 523, the second outer sidewall 524, or the second inner sidewalls 525 may have heights different from each other. For example, the second protrusion 523 and the second inner sidewalls 525 may have heights higher than that of the second outer sidewall 524. Here, the height may represent a distance that is spaced apart from the support surface 5211 in the first direction D1.

The second protrusion 523 may have a pillar shape, but is not limited thereto. The second inner sidewall 525 may have a cylindrical shape, but is not limited thereto. The second inner sidewall 525 may be spaced apart from the second protrusion 523. The second inner sidewall 525 may surround a circumference of the second protrusion 523. The second inner sidewall 525 may have an inner diameter greater than a diameter of the second protrusion 523. Thus, a third space S3 may be defined between the second inner sidewall 525 and the second protrusion 523.

The second outer sidewall 524 may be spaced apart from the second inner sidewall 525. The second outer sidewall 524 may surround a circumference of the second inner sidewall 525. The second outer sidewall 524 may have an inner diameter greater than an outer diameter of the second inner sidewall 525. Thus, a fourth space S4 may be defined between the second outer sidewall 524 and the second inner sidewall 525. The second inner sidewall 525 may be disposed between the second outer sidewall 524 and the second protrusion 523.

The coupling plate 522 may be connected to the support plate 521. The support plate 521 and the coupling plate 522 may be disposed perpendicular to each other, but is not limited thereto. The coupling plate 522 may be coupled to an inner surface of the housing (see reference numeral 10 of FIG. 1). In a some embodiment, the coupling plate 522 may have a coupling hole 5221. A plurality of screw threads (not shown) may be formed on an inner surface of the coupling hole 5221. Thus, the coupling plate 522 may be coupled to the inner surface of the housing 10 through a bolt. On the other hand, in another embodiment, the coupling plate 522 may be coupled to the inner surface of the housing 10 through welding.

Figure 8:
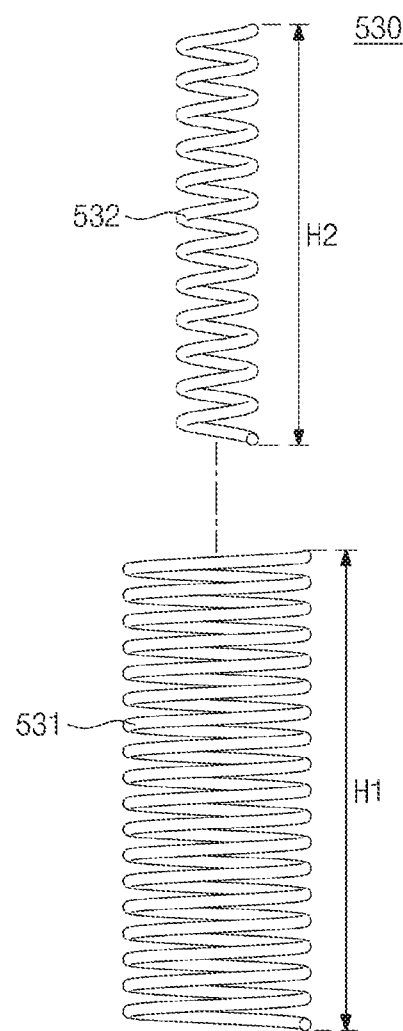
FIG. 8 is a perspective view of an elastic member of FIG. 2.

FIG. 8 is a perspective view of the elastic member of FIG. 2.

Referring to FIGS. 2 and 8, the elastic member 530 may be disposed between the guide member 510 and the support member 520. In an embodiment, the chain tensioner 50 may include one elastic member 530, but is not limited thereto.

The elastic member 530 may include a first coil spring 531 and a second coil spring 532. The second coil spring 532 may be disposed within the first coil spring 531. The first coil spring 531 may have an inner diameter greater than an outer diameter of the second coil spring 532. The second coil spring 532 inside the first coil spring 531 may be spaced apart from the first coil spring 532. For example, the first coil spring 531 may surround a circumference of the second coil spring 531 in a state in which the first coil spring 531 is spaced apart from the second coil spring 532.

The second coil spring 532 may have a length H2 less than a length H1 of the first coil spring 531. The length H1 of the first coil spring 531 may be a spaced distance between both ends thereof. The length H2 of the second coil spring 532 may be a spaced distance between both ends thereof.

In an embodiment, each of the first and second coil springs 531 and 532 may have a longitudinal direction parallel to the first direction (see reference symbol D1 of FIG. 2). In an embodiment, the first coil spring 531 may have a spring constant (hereinafter, referred to as a first spring constant) different from that (hereinafter, referred to as a second spring constant) of the second coil spring 532. For example, the second spring constant may be greater than the first spring constant. On the other hand, in another embodiment, the first and second spring constants may be the same.

Figure 9:
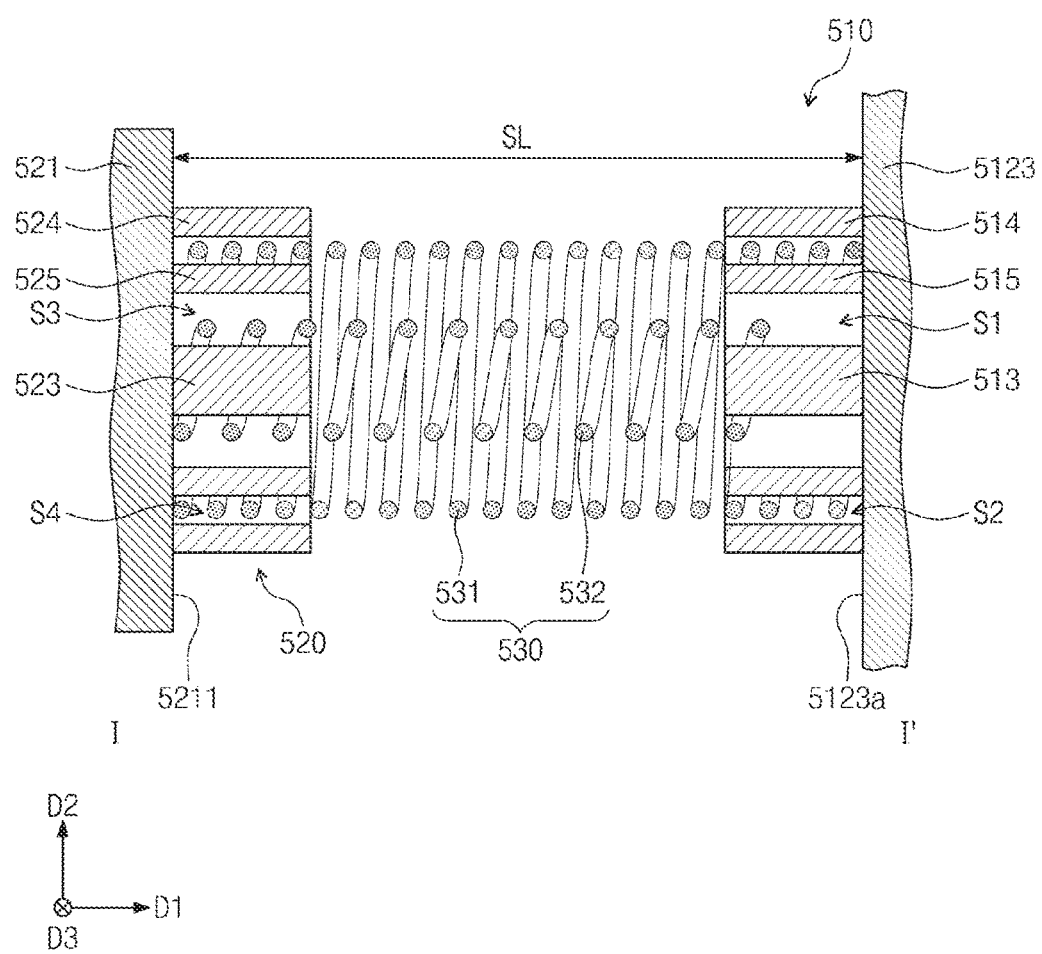
FIG. 9 is a cross-sectional view taken along line I-I' of FIG. 2.

FIG. 9 is a cross-sectional view taken along line I-I' of FIG. 2.

Referring to FIGS. 2 to 9, the first coil spring 531 may be disposed adjacent to the other end of the guide member 510. The first coil spring 531 may have one end coming into contact with the support member 520. The first coil spring 531 may have the other end coming into contact with the guide member 510. Thus, the first coil spring 531 may elastically support the guide member 510.

The second coil spring 532 may be disposed on the support member 520. The second coil spring 532 may have one end coming into contact with the support member 520. The second coil spring 532 may have the other end spaced apart from the guide member 510.

Each of the first and second protrusions 513 and 523 may be inserted into the second coil spring 532. The first and second protrusions 513 and 523 may face each other. The first and second protrusions 513 and 523 may overlap each other. Each of the first and second inner sidewalls 515 and 525 may surround a portion of a circumference of the second coil spring 532. The first and second inner sidewalls 515 and 525 may face each other. The first and second inner sidewalls 515 and 525 may overlap each other. The second coil spring 532 may have one end disposed in the third space S3. The second coil spring 532 may have the other end disposed in the first space S1.

Each of the first and second inner sidewalls 515 and 525 may be inserted into the first coil spring 531. Each of the first and second outer sidewalls 514 and 524 may surround a portion of a circumference of the first coil spring 531. The first coil spring 531 may have one end disposed in the fourth space S4. The first coil spring 531 may have the other end disposed in the second space S2. The first and second inner sidewalls 515 and 525 may face each other. The first and second inner sidewalls 515 and 525 may overlap each other.

The support member 520 may further include a second stopper (not shown) for fixing one end of the first coil spring 532 to the support surface 5211. Thus, the second coil spring 532 may not move in the first direction D1 by vibration of a vehicle. A spaced distance SL between the second surface 5123a and the support surface 5211 may vary by external force. This will be described later in detail with reference to FIG. 10.

Figure 10:
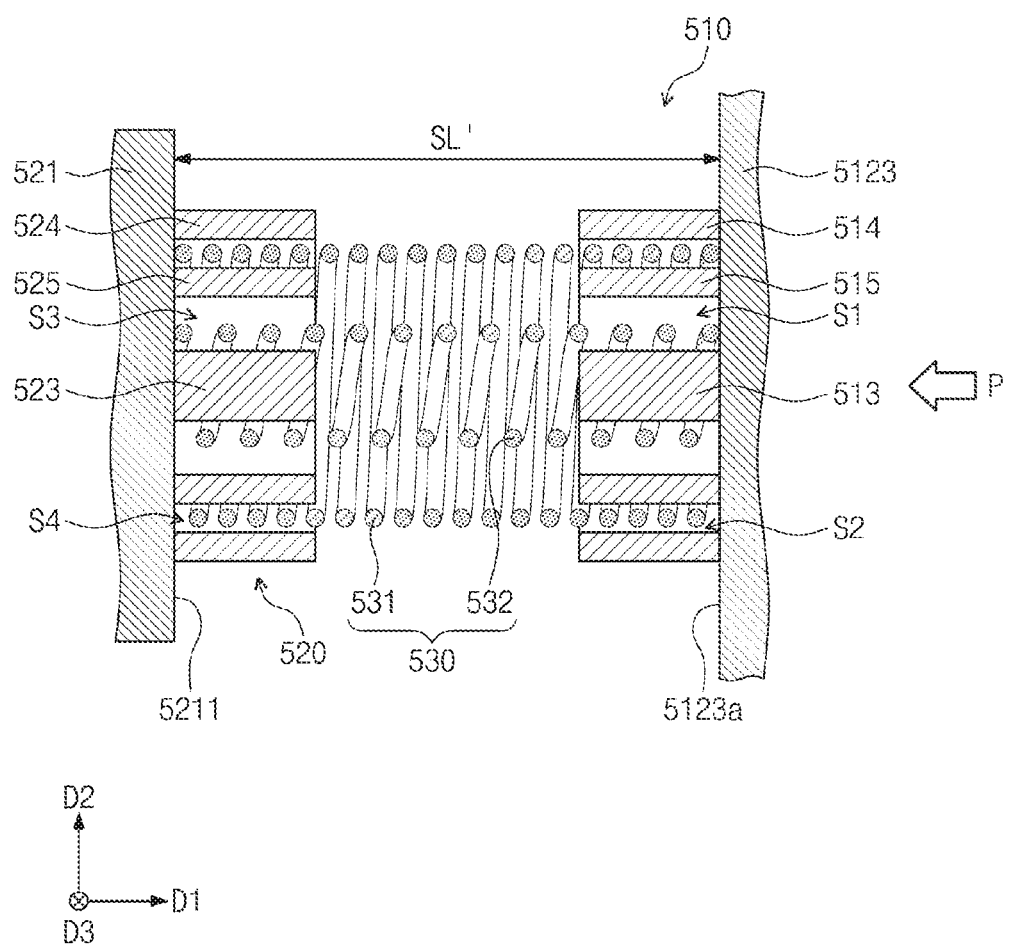
FIG. 10 is a longitudinal cross-sectional view illustrating a state in which the chain tensioner of FIG. 2 is pressed by a chain.

FIG. 10 is a longitudinal cross-sectional view illustrating a state in which the chain tensioner of FIG. 2 is pressed by the chain. FIG. 10 is a cross-sectional corresponding to that of FIG. 9.

FIGS. 2, 9, and 10, the guide member 510 may receive a load P of the chain. Here, the guide member 510 may rotate in a counterclockwise direction with respect to the hinge shaft 540. That is, the guide member 510 may press the elastic member 530. The elastic member 530 may provide elastic force corresponding to the load P of the chain to the guide member 510. Thus, the elastic member 530 may support the load P of the chain.

For example, the first coil spring 531 may primarily provide the elastic force corresponding to the load P of the chain to the guide member 510. Thus, the first coil spring 531 may primarily support the load P of the chain. However, when the load P of the chain is greater than the elastic force provided from the first coil spring 531, the guide member 510 may rotate in the counterclockwise direction with respect to the hinge shaft 540. When the guide member 510 rotates in the counterclockwise direction, a spaced distance SL' between the second surface 5123a and the support surface 5211 may be reduced, and the guide member 510 may elastically deform the first coil spring 531. That is, the length (see reference symbol H1 of FIG. 8) of the first coil spring 531 may be shortened. Thus, the second surface 5123a of the guide member 510 may come into contact with the second coil spring 532.

The second coil spring 532 together with the first coil spring 531 may provide the elastic force corresponding to the load P of the chain to the guide member 510. Thus, the first and second coil springs 531 and 532 may support the load P of the chain. Therefore, the chain tensioner 50 may support the large load P of the chain (see reference numeral 20 of FIG. 1).

Figure 11:
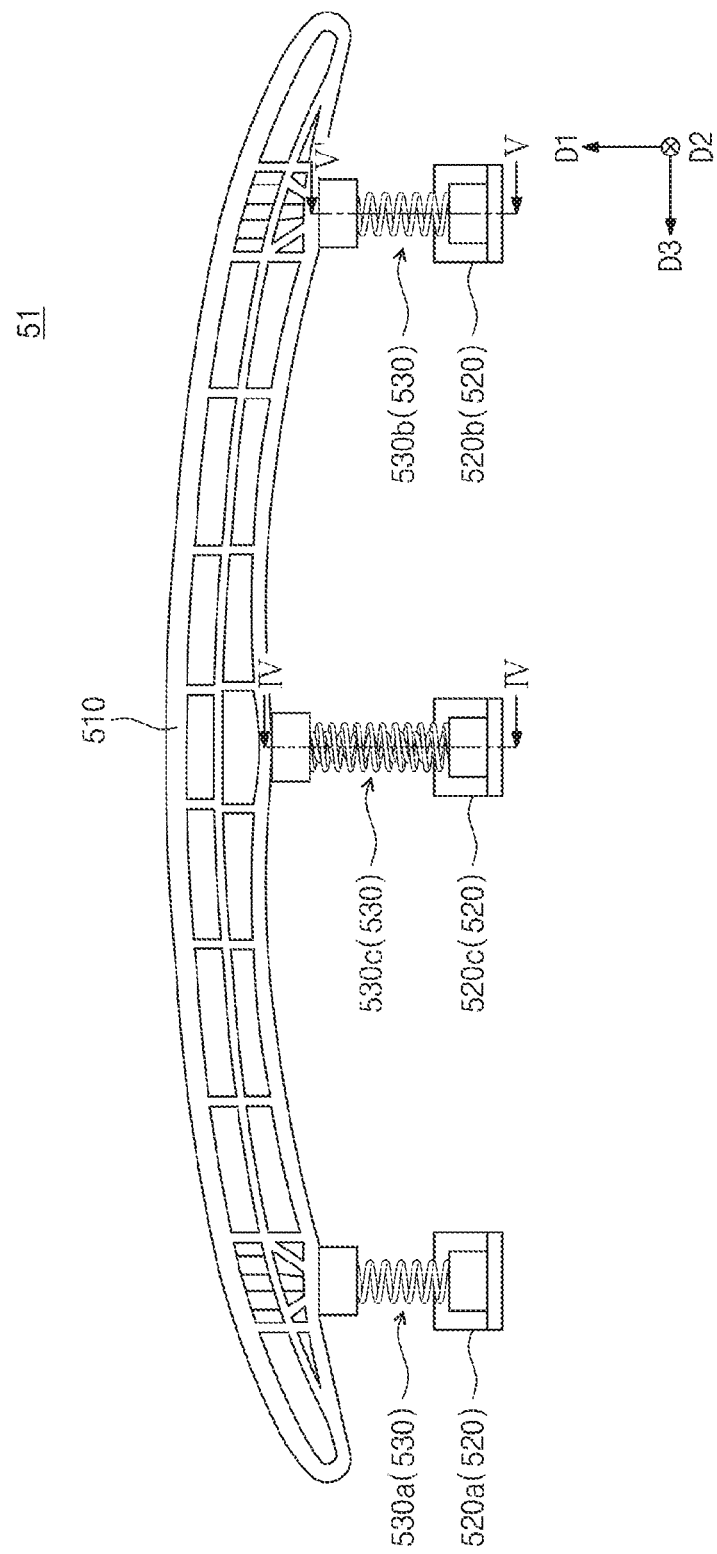
FIG. 11 is a schematic view illustrating a modified example of the chain tensioner of FIG. 2.
Figure 12:
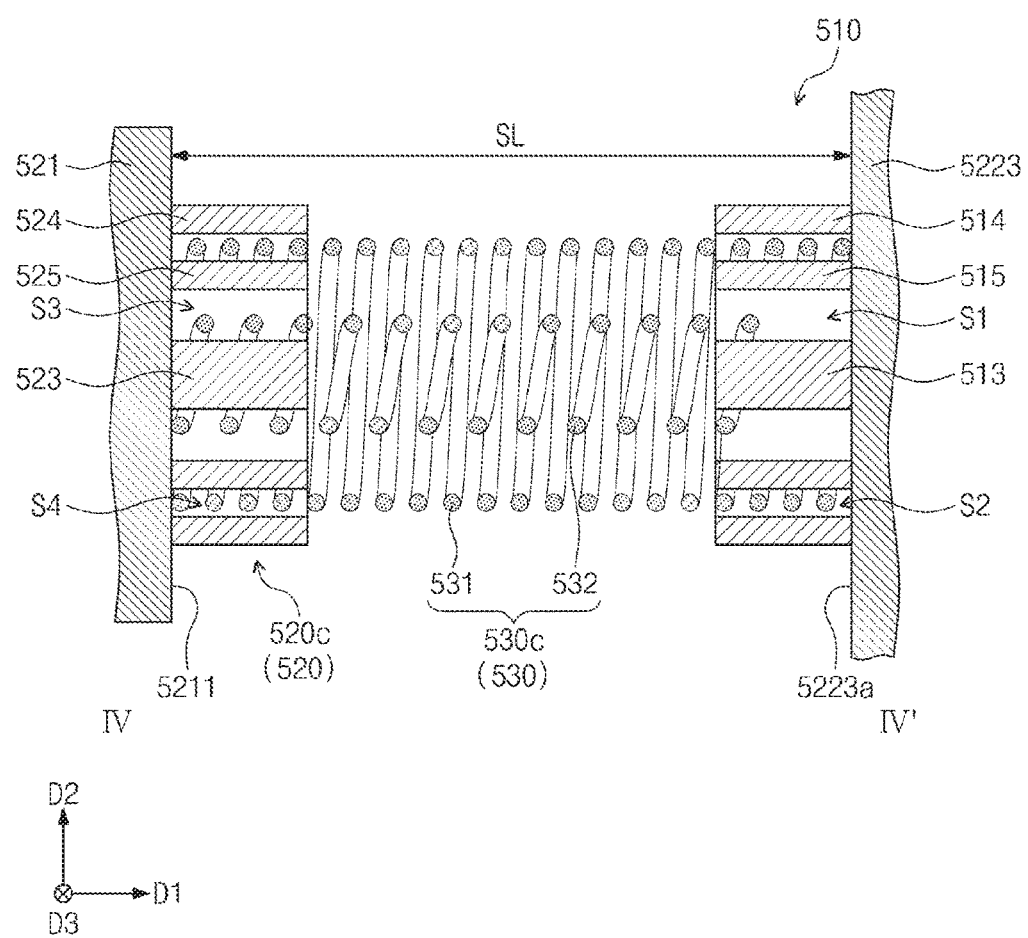
FIG. 12 is a cross-sectional view taken along line IV-IV' of FIG. 11.
Figure 13:
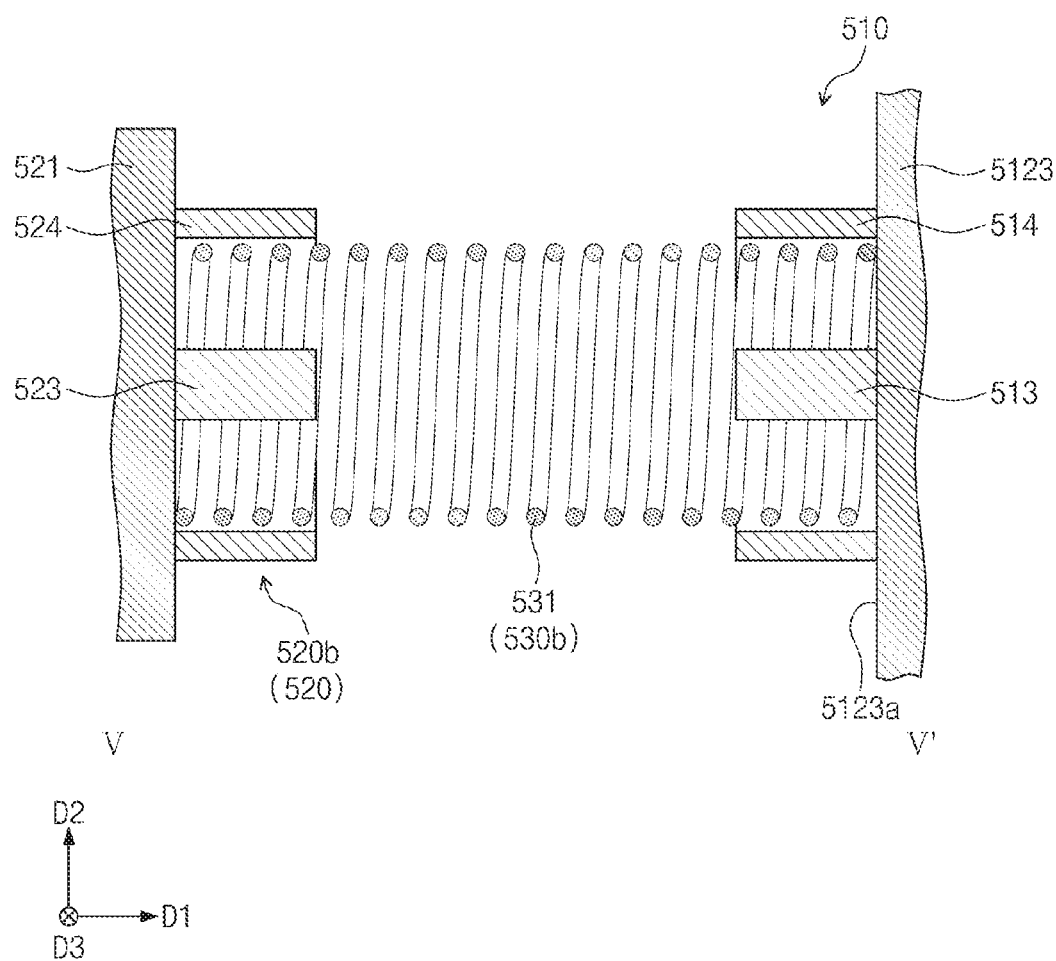
FIG. 13 is a cross-sectional view taken along line V-V' of FIG. 11.

FIG. 11 is a schematic view illustrating a modified example of the chain tensioner of FIG. 2. FIG. 12 is a cross-sectional view taken along line IV-IV' of FIG. 11. FIG. 13 is a cross-sectional view taken along line V-V' of FIG. 11. For briefness of description, descriptions with respect to substantially the same component as that described with reference to FIGS. 2 and 9 according to the foregoing embodiment will be omitted or briefly described. Unlike the chain tensioner 50 of FIG. 2, a chain tensioner 51 of FIG. 11 may include a plurality of elastic members 530 and a plurality of support members 520.

Referring to FIGS. 11 to 13, the chain tensioner 51 may include the guide member 510, the plurality of support members 520, and the plurality of elastic members 530. Unlike the chain tensioner 50 of FIG. 2, the chain tensioner 51 of FIG. 11 may not include the hinge shaft (see reference numeral 540 of FIG. 2), and the guide member 510 may not have the insertion hole (see reference numeral 5125 of FIG. 3).

The plurality of elastic members 530 may be arranged in the longitudinal direction D3 of the guide member 510. The elastic members 530 may be spaced apart from each other. In an embodiment, the chain tensioner 51 may include first to third elastic members 530a, 53b, and 530c and first to third support members 520a, 520b, and 520c.

Each of the first to third elastic members 530a, 530b, and 530c may include one first coil spring 531. Thus, the three first coil springs 531 may be disposed to be spaced apart from each other in the longitudinal direction D3 of the guide member 510.

The first elastic member 530a may be disposed on an area of one end of the guide member 510. The second elastic member 530b may be disposed on an area of the other end of the guide member 510. The third elastic member 530c may be disposed between the first and second elastic members 530a and 530b. The third elastic member 530c may be disposed on an intermediate area of the guide member 510.

For example, the first coil spring 531 of the first elastic member 530a may be disposed on the area of the one end of the guide member 510 to elastically support the guide member 510. The first coil spring 531b of the second elastic member 530b may be disposed on the area of the other end of the guide member 510 to elastically support the guide member 510. The third elastic member 530c may be disposed on the intermediate area of the guide member 510 to elastically support the guide member 510.

As described above, the guide member 510 may protrude to the chain guide (see reference numeral 60 of FIG. 1). Thus, the load of the chain may be concentrated into the intermediate area of the guide member 510. That is, the load of the chain may be concentrated into the third elastic member 530c.

The third elastic member 530c may further include a second coil spring 532. That is, the second coil spring 532 may be disposed within the first coil spring 531c disposed on the intermediate area of the guide member 510. Thus, the third elastic member 530c may support the concentrated load of the chain.

The load of the chain may be applied to the areas of the one end and the other end of the guide member 510 in comparison to the intermediate area. Thus, each of the first and second elastic members 530a and 530b may not include the second coil spring 532, unlike the third elastic member 530c. In the guide member 510, the first inner sidewall 515 may be omitted on the areas corresponding to the first and second elastic members 530a and 530b. In the support members 520a and 520b, the second inner sidewall 525 may be omitted on the areas corresponding to the first and second elastic members 530a and 530b. On the other hand, in another embodiment, each of the first and second elastic members 530a and 530b may include the second coil spring 532.

According to the embodiments of the inventive concept, the chain tensioner may support the large load of the chain. The chain tensioner may be reduced in manufacturing cost and/or weight.

The effects of the present invention are not limited to the aforementioned effects, but other objects not described herein will be clearly understood by those skilled in the art from descriptions below.

While the invention has been described in terms of exemplary embodiments, it is to be understood that the present invention is not limited to the foregoing specific embodiment. As is understood by persons of ordinary skill in the art, a variety of modifications can be made without departing from the scope of the invention defined by the following claims, which should be given their fullest, fair scope.

What is claimed is:

1. A chain tensioner comprising:
a guide member;
a support member spaced apart from the guide member;
at least one first coil spring disposed between the guide member and the support member to elastically support the guide member; and
a second coil spring disposed within the first coil spring and disposed on the support member,
wherein the second coil spring has a length less than that of the first coil spring.

2. The chain tensioner of claim 1, wherein the first coil spring has a spring constant different from that of the second coil spring.

3. The chain tensioner of claim 1, wherein the first coil spring is provided in plurality, and
the plurality of first coil springs are disposed to be spaced apart from each other in a longitudinal direction of the guide member.

4. The chain tensioner of claim 3, wherein one of the first coil springs is disposed on an intermediate area of the guide member.

5. The chain tensioner of claim 4, wherein the second coil spring is disposed within the first coil spring disposed on the intermediate area of the guide member and disposed on the support member.

6. The chain tensioner of claim 1, wherein the guide member has an insertion hole defined adjacent to one end thereof to pass therethrough, and
the first coil spring is disposed adjacent to the other end of the guide member.

7. The chain tensioner of claim 1, wherein the guide member comprises:
a guide shoe having a guide surface;
a main body having a first surface configured to support the guide shoe and a second surface facing the first surface;
a first protrusion protruding from the second surface to the support member; and
a first outer sidewall protruding from the second surface to the support member and spaced apart from the first protrusion to surround the first protrusion.

8. The chain tensioner of claim 7, wherein the guide member further comprises a first inner sidewall protruding from the second surface to the support member and disposed between the first outer sidewall and the first protrusion to surround the first protrusion.

9. The chain tensioner of claim 1, wherein the support member comprises:
a support plate configured to support the first coil spring;
a second protrusion protruding from the support plate to the guide member; and
a second outer sidewall protruding from the support plate to the guide member and spaced apart from the second protrusion to surround the second protrusion.

10. The chain tensioner of claim 9, wherein the support member comprises a second inner sidewall protruding from the support plate to the guide member and disposed between the second protrusion and the second outer sidewall to surround the second protrusion.

* * * * *